US012593334B2

(12) United States Patent　　(10) Patent No.:　US 12,593,334 B2
Hassan　　(45) Date of Patent:　Mar. 31, 2026

(54) METHODS, APPARATUS, AND LIGHTWEIGHT VEHICLE

(71) Applicant: Robert Bosch GmbH, Stuttgart (DE)

(72) Inventor: Khaled Shawky Hassan, Laatzen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 570 days.

(21) Appl. No.: 18/049,310

(22) Filed: Oct. 25, 2022

(65) Prior Publication Data

US 2023/0141342 A1　　May 11, 2023

(30) Foreign Application Priority Data

Nov. 10, 2021　(EP) ..................................... 21207394

(51) Int. Cl.
| | |
|---|---|
| *H04W 72/20* | (2023.01) |
| *H04W 4/40* | (2018.01) |
| *H04W 4/48* | (2018.01) |
| *H04W 40/22* | (2009.01) |
| *H04W 72/23* | (2023.01) |
| *H04W 72/40* | (2023.01) |
| *H04W 72/51* | (2023.01) |
| *H04W 88/04* | (2009.01) |

(52) U.S. Cl.
CPC ............. *H04W 72/20* (2023.01); *H04W 4/40* (2018.02); *H04W 4/48* (2018.02); *H04W 40/22* (2013.01); *H04W 72/23* (2023.01); *H04W 72/40* (2023.01); *H04W 72/51* (2023.01); *H04W 88/04* (2013.01)

(58) Field of Classification Search
CPC ........... H04W 28/0875; H04W 36/037; H04W 40/22; H04W 72/02; H04W 72/04; H04W 72/12; H04W 72/20; H04W 72/23–232; H04W 72/40; H04W 72/51; H04W 88/04; H04W 4/40–48; H04W 72/25; H04W 72/512; H04W 84/18; G08G 1/166; G08G 1/22

See application file for complete search history.

(56) References Cited

U.S. PATENT DOCUMENTS

| | | | |
|---|---|---|---|
| 2020/0146048 A1* | 5/2020 | Lee ...................... | H04W 72/535 |
| 2020/0314612 A1 | 10/2020 | Kang et al. | |
| 2021/0045093 A1* | 2/2021 | Rao ........................ | H04W 76/14 |
| 2021/0211947 A1 | 7/2021 | Agiwal et al. | |

(Continued)

FOREIGN PATENT DOCUMENTS

| | | |
|---|---|---|
| EP | 3471075 A1 | 4/2019 |
| WO | 2020166090 A1 | 8/2020 |

*Primary Examiner* — Thomas R Cairns
(74) *Attorney, Agent, or Firm* — NORTON ROSE FULBRIGHT US LLP

(57)　　ABSTRACT

A method for operating an apparatus of a lightweight vehicle, especially of a pedal electric cycle or of an electric kick scooter. The method includes: pairing the apparatus with a personal mobile terminal to use the personal mobile terminal as a relay station; receiving at least one control information, which originates from a radio access node and which characterizes at least one configuration parameter of a sidelink channel; determining at least one V2X message; determining at least one radio resource of the sidelink channel based on the at least one control information; and transmitting, via the at least one radio resource of the sidelink channel, the at least one V2X message.

21 Claims, 8 Drawing Sheets

(56)　　　　　　References Cited

U.S. PATENT DOCUMENTS

| | | | |
|---|---|---|---|
| 2021/0329648 A1* | 10/2021 | Osawa | H04W 76/14 |
| 2023/0105751 A1* | 4/2023 | Lee | H04W 76/14 |
| | | | 370/329 |
| 2023/0246701 A1* | 8/2023 | Cheng | H04W 72/0453 |
| | | | 370/315 |
| 2024/0422837 A1* | 12/2024 | Seo | H04W 4/02 |

* cited by examiner

METHODS, APPARATUS, AND LIGHTWEIGHT VEHICLE

CROSS REFERENCE

The present application claims the benefit under 35 U.S.C. § 119 of European Patent Application No. EP 21 20 7394.4 filed on Nov. 10, 2021, which is expressly incorporated herein by reference in its entirety.

FIELD

The present invention concerns advances in communication and control of lightweight vehicles.

SUMMARY

An aspect of the present invention is directed to the following subject matter: A method for operating an apparatus of a lightweight vehicle especially of a pedal electric cycle or of an electric kick scooter or of a motor cycle or of a ⅔-wheeler. According to an example embodiment of the present invention, the method includes: pairing the apparatus with a personal mobile terminal in order to use the personal mobile terminal as a relay station; receiving at least one control information, which originates from a radio access node and which characterizes at least one configuration parameter of a sidelink channel; determining at least one V2X message; determining at least one radio resource of the sidelink channel based on the at least one control information; and transmitting, via the at least one radio resource of the sidelink channel, the at least one V2X message.

Advantageously, the paired UE facilitates the transmission of V2X message by providing the control information for facilitated use of the sidelink channel. Therefore, the apparatus can be provided with reduced radio capabilities reducing costs. Moreover, the apparatus can be inactive on Uu most of the time, which does not disrupt the Sidelink configuration due to the paired personal mobile terminal to which communication is active.

An advantageous example embodiment of the present invention includes transmitting, via the personal mobile terminal towards the radio access node, a capability indicator that indicates at least one radio capability of the apparatus; and the control information is received via the personal mobile terminal as a response to the transmitted capability indicator.

Advantageously, the radio access node is able to configure and control the apparatus according to its shared radio capabilities.

An advantageous example embodiment of the present invention includes determining at least one further radio resource of the sidelink channel based on the at least one received control information; determining at least one V2N message; and transmitting, via the at least one further radio resource via the via the personal mobile terminal towards the radio access node, the at least one V2N message.

Advantageously, the apparatus is also capable of communicating via Uu interface. This allows the light vehicle to participate in larger traffic scenarios.

An advantageous example embodiment of the present invention includes determining at least one another radio resource of the sidelink channel based on the at least one received control information; and in receiving, via the at least one another radio resource at least one further V2N message from the personal mobile terminal that originates from the radio access node.

Advantageously, the relayed data is forwarded to the vehicle-side apparatus without the need of having a full-equipped Uu transmission system.

An advantageous example embodiment of the present invention includes receiving at least one further control information, which originates from the radio access node and which characterizes at least one further configuration parameter of the sidelink channel; the at least one control information is received via the sidelink channel; the determining of the at least one radio resource of the sidelink channel is based on the at least one control information and based on the at least one further control information.

Advantageously, according to an example embodiment of the present invention, the sidelink channel is configured via Uu and PC5 interface.

In an advantageous example embodiment of the present invention, the at least one further control information characterizes at least one quasi-static configuration parameter of the sidelink channel; and the at least one control information characterizes at least one dynamic configuration parameter of the sidelink channel.

Advantageously, the apparatus according to an example embodiment of the present invention is configured with the quasi-static configuration parameters via the downlink channel and the dynamic parameters are received via the sidelink channel. Therefore, a basic configuration of the sidelink channel can be provided by a reduced-capability communication module for receiving downlink data and the further dynamically changing configuration parameters for the sidelink are received via a sidelink communication module.

An aspect of the present invention is directed to the following subject matter: An apparatus of a vehicle especially of a pedal electric cycle or of an electric kick scooter. According to an example embodiment of the present invention, the apparatus includes: pairing means (i.e., a pairing device) to pair the apparatus with a personal mobile terminal in order to use the personal mobile terminal as a relay station; receiving means (i.e., a receiver) to receive at least one control information, which originates from a radio access node and which characterizes at least one configuration parameter of a sidelink channel; determining means (i.e., a determination device) to determine at least one V2X message; determining means (i.e., a determination device) to determine at least one radio resource of the sidelink channel based on the at least one control information; and transmitting means (i.e., a transmitter) to transmit, via the at least one radio resource of the sidelink channel, the at least one V2X message.

An advantageous example embodiment of the present invention includes transmitting means to transmit, via the personal mobile terminal towards the radio access node, a capability indicator that indicates at least one radio capability of the apparatus; and the control information is received via the personal mobile terminal as a response to the transmitted capability indicator.

An advantageous example embodiment of the present invention includes that there are provided determining means to determine at least one further radio resource of the sidelink channel based on the at least one received control information; determining means to determine at least one V2N message; and transmitting means to transmit, via the at least one further radio resource via the via the personal mobile terminal towards the radio access node, the at least one V2N message.

An advantageous example of the present invention includes that determining means to determine at least one another radio resource of the sidelink channel based on the at least one received control information.

An advantageous example embodiment of the present invention includes that there are provided receiving means to receive at least one further control information, which originates from the radio access node and which characterizes at least one further configuration parameter of the sidelink channel; the at least one control information is received via the sidelink channel; the determining of the at least one radio resource of the sidelink channel is based on the at least one control information and based on the at least one further control information.

An advantageous example embodiment of the present invention includes that the at least one further control information characterizes at least one quasi-static configuration parameter of the sidelink channel; and the at least one control information characterizes at least one dynamic configuration parameter of the sidelink channel.

Another aspect of the present invention is directed a lightweight vehicle especially a pedal electric cycle or an electric kick scooter, comprising the apparatus according the former aspect.

DETAILED DESCRIPTION OF EXAMPLE EMBODIMENTS

Figure 1:
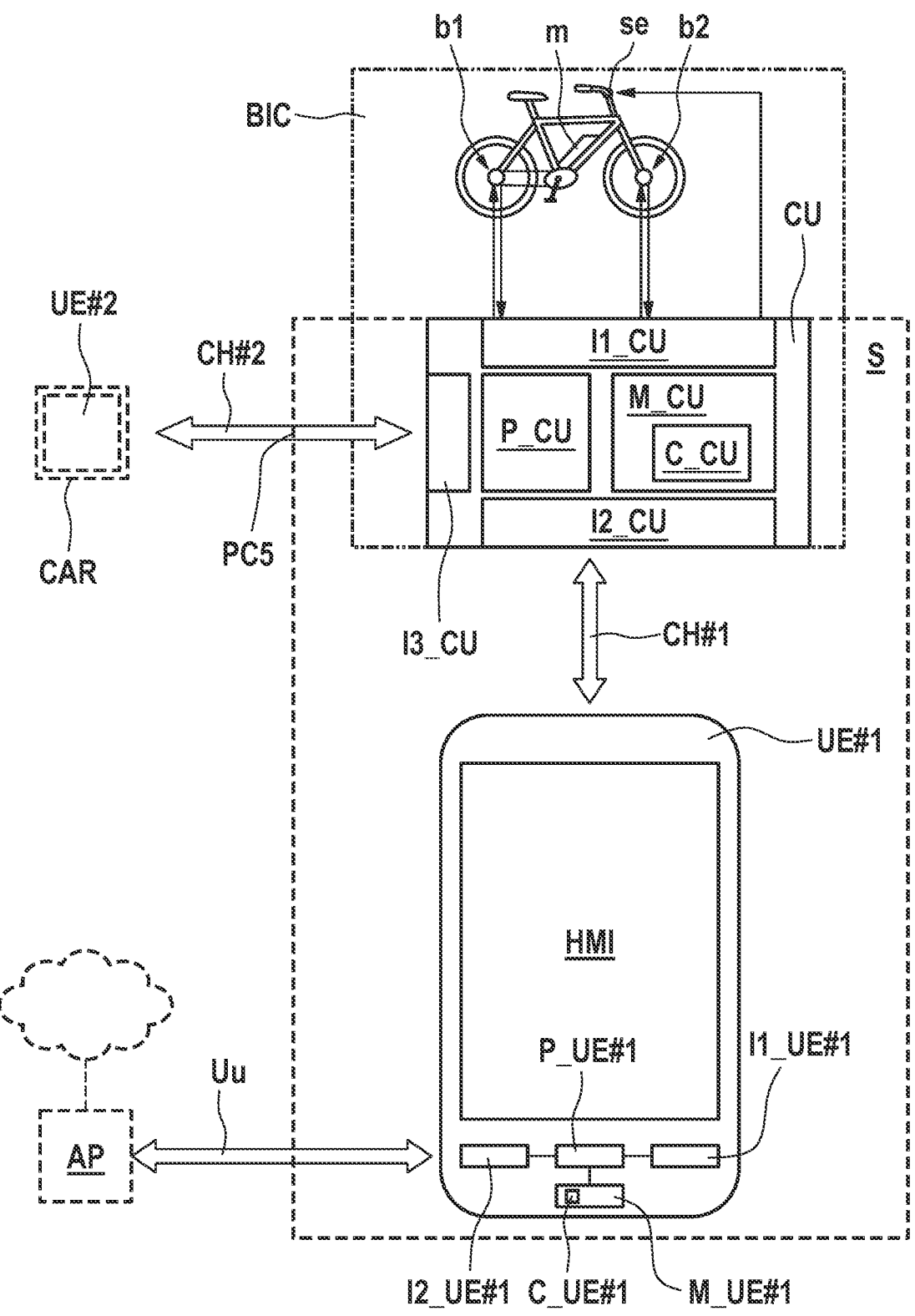
FIG. 1 depicts in a schematic block diagram a control unit of a lightweight vehicle and a personal mobile terminal, according to example embodiment of the present invention.

FIG. 1 depicts schematically a block diagram. A lightweight vehicle BIC is depicted as a pedal electric bicycle and comprises at least one actuator, at least one sensor, and a control unit CU. For example, the lightweight vehicle BIC does not exceed 50 kg. The at least one actuator comprises at least one of the following: a brake b1, b2, a motor m, and a signalizing entity se. The respective actuator provides at least one of the following functions: brake assistance, motor speed regulation, motor disengaging, alarm light, etc.

The at least one sensor comprises at least one of the following: a sensor for sensing a state of one of the brakes b1, b2; a sensor for sensing a motor state of the motor m, a sensor indicating an operating condition of an external lighting. Accordingly, sensor information may include information from at least one of the following sources: light sensors, brake sensors (e.g., gyro (inertia)-sensor or electronic braking system (e.g., EBS/ABS) device or a brake-lever switch/clutch), acceleration sensor, speed sensor, right/left turning sign/axis sensor, battery level sensor, motor vital information sensors.

The control unit CU comprises a first interface I1_CU for receiving signals from the at least one sensor and for transmitting at least one operating instruction to the at least one actuator.

The control unit CU comprises a third interface I3_CU to communicate via a second radio channel CH #2 with a further radio terminal UE #2 of another vehicle CAR. The radio channel CH #2 is a direct communication channel to a mobile terminal UE #2 of another vehicle CAR. The control unit CU is adapted to transmit and receive V2X service messages (V2X: Vehicle to everything) and/or to transmit and receive VRU service messages (VRU: Vulnerable Road User) to the radio access network (RAN) via Uu interface.

The control unit CU comprises a memory unit M_CU, and a processing unit P_CU. On the non-transitory memory unit M_CU, a computer program C_CU is stored. When executing the computer program C_CU on the processing unit P_CU, the processing unit P_CU causes, together with the memory unit M_CU, and the interfaces I1_CU, I2_CU and I3_CU, the control unit CU to conduct the methods described herein.

The control unit CU comprises a second interface I2_CU for communicating via a radio channel CH #1 with a personal mobile terminal UE #1. The personal mobile terminal UE comprises a first interface I1_UE to communicate via the channel CH #1 with the control unit CU.

According to an example, the radio channels CH #1 and CH #2 represent the sidelink channel. According to another example, the radio channel CH #2 is the sidelink channel and the radio channel CH #1 is a radio channel different from the sidelink channel, for example a Bluetooth channel, WLAN channel or the like.

The personal mobile terminal UE #1 comprises a second interface I2_UE to communicate an access point AP like a base-station (e.g. a gNB or an eNB) to communicate with a backhaul entity. Additionally, the interface I2_UEa is enabled to communicate with another communication entity in a remote network AP or in a Radio Access Network, RAN. The radio channel CH #3 comprises at least on one of the following: an uplink or downlink channel to/from the access point AP or a base-station.

The personal mobile terminal UE #1 comprises a non-transitory memory unit M_UEa, a human machine interface HMI in form of a touch panel, and a processing unit P_UE. On the memory unit M_UE, a computer program C_UE is stored. When executing the computer program C_UE on the processing unit P_UE, the processing unit P_UE causes, together with the memory unit M_UE, and the interfaces I1_UE and I2_UE, the personal mobile terminal UE #1 to conduct the methods described herein.

The personal mobile terminal UE #1 is a U2N relay that is connected to the remote eBike/uMobility device modem (sidelink) via PC5 interface to be able to configure the sidelink modem on lower layers (L1/L2). U2N relay is connected to the remote eBike/uMobility device modem (sidelink) using unicast connection. U2N relay is configured as relay by upper layer (e.g., once it is associated/paired to an eBike), wherein the U2N relay requests the network accordingly to acknowledge its relay functionalities.

Figure 2:
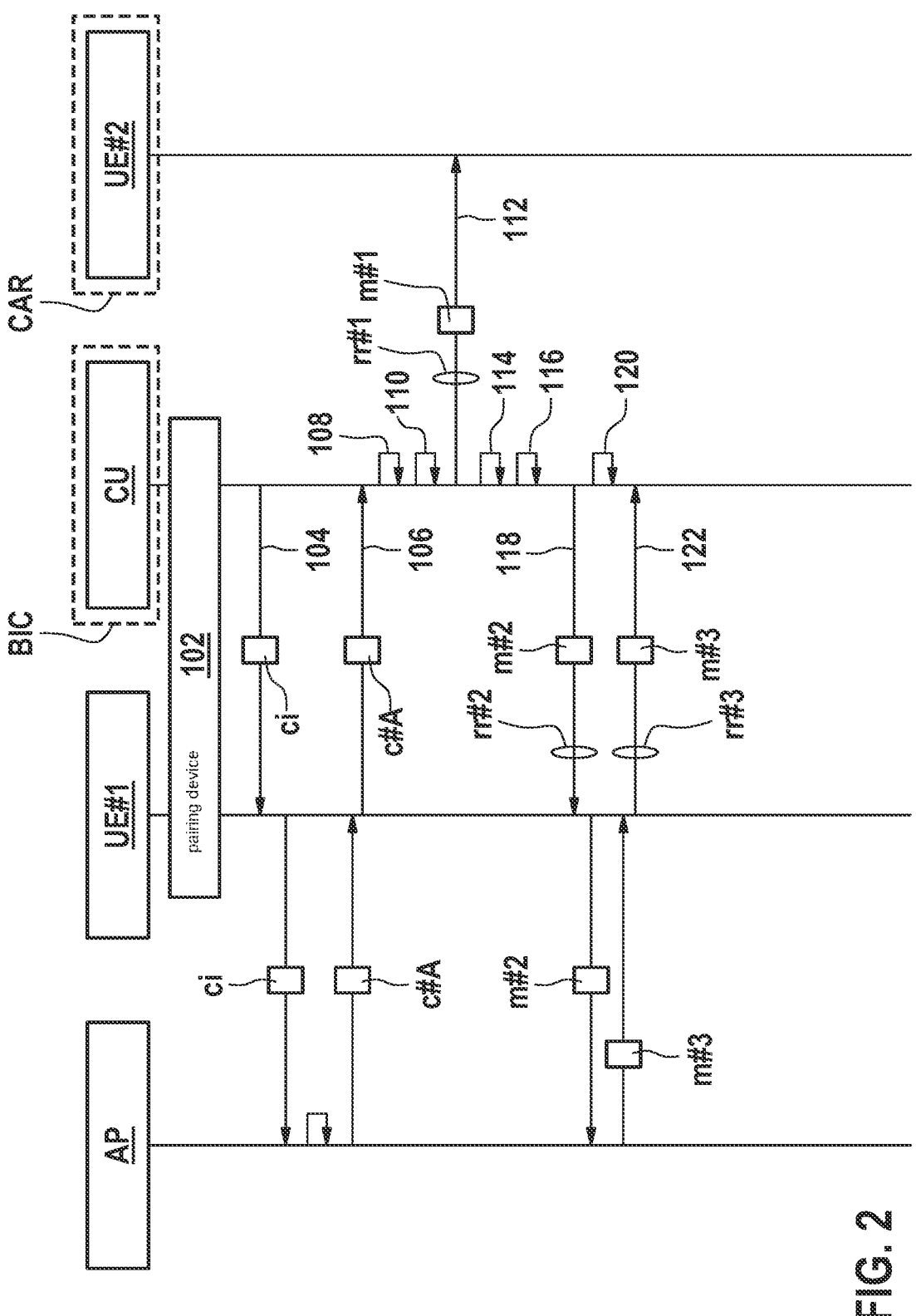
FIGS. 2, 6, and 8 each depict a sequence diagram according to an example embodiment of the present invention.

FIG. 2 depicts a schematic sequence diagram. The apparatus CU of the lightweight vehicle BIC, especially of a pedal electric cycle or of an electric kick scooter, comprises pairing means (i.e., a pairing device) 102 to pair the apparatus CU with the personal mobile terminal UE #1 in order to use the personal mobile terminal UE #1 as a relay station; Pairing of CU and UE #1 comprises a communication over an air interface or wired interface to couple both CU and UE #1 in order to use UE #1 as a relay station for exchanging data with a radio access node of a radio access network.

Receiving means (i.e., a receiver) 106 are provided to receive at least one control information c #A, which originates from the radio access node AP and which characterizes at least one configuration parameter of a sidelink channel. The radio access node AP is embodied as gNB odea node base-station, NB.

Determining or processing means (i.e., a determination or processor device) 108 are provided to determine at least one V2X message m #1 that comprises status information that characterizes a status associated with the lightweight vehicle, wherein the status information represents at least one kinematic parameter of the lightweight vehicle or at least one traffic parameter characterizing a traffic situation in the vicinity of the lightweight vehicle.

Determining or processing means (i.e., a determination or processor device) 110 are provided to determine at least one radio resource rr #1 of the sidelink channel based on the at least one control information c #A. The radio resource rr #1 is part of the sidelink channel and is determined in the sense of being identified or selected for transmission.

Transmitting means (i.e., a transmitter) 112 are provided to transmit, via the at least one radio resource rr #1 of the sidelink channel SLCH, the at least one V2X message m #1 comprising the at least one status information towards a further vehicle CAR.

Transmitting means (i.e., a transmitter) 104 are provided to transmit, via the personal mobile terminal UE #1 towards the radio access node AP, a capability indicator ci that indicates at least one radio capability of the apparatus CU.

According to other examples, the apparus CU transmits via UE #1 at least one of the following indicators:

Sidelink capability indicator, e.g., sidelink supported frequency bands, sidelink supported bandwidth/bandwidth part, sidelink supported resource allocation mode, etc.;

Sidelink connectivity request/response indicator;

Sidelink radio link quality indicator;

Sidelink user profile indicator;

Sidelink transmission resource grant request; and

Sidelink "conditional" handover indicator.

The control information c #A is received via the personal mobile terminal UE #1 as a response to the transmitted capability indicator ci.

Determining or processing means (i.e., a determination or processor device) 114 are configured to determine at least one further radio resource rr #2 of the sidelink channel based on the at least one received control information c #A.

Determining or processing means (i.e., a determination or processor device) 116 are configured to determine at least one V2N message m #2 comprising at least one traffic parameter characterizing a traffic situation in the vicinity of the lightweight vehicle.

Transmitting means (i.e., a transmitter) 118 are configured to transmit, via the at least one further radio resource rr #2 via the via the personal mobile terminal UE #1 towards the radio access node AP, the at least one V2N message m #2.

Determining or processing means (i.e., a determination or processor device) 120 are configured to determine at least one another radio resource rr #3 of the sidelink channel based on the at least one received control information c #A.

Monitoring means (i.e., a monitor) monitor the at least one another radio resource rr #3 and receiving means (i.e., a receiver) 122 receive, via the at least one another radio resource rr #3 that is being monitored at least one further V2N message m #3 from the personal mobile terminal UE #1 that originates from the radio access node AP.

Figure 3:
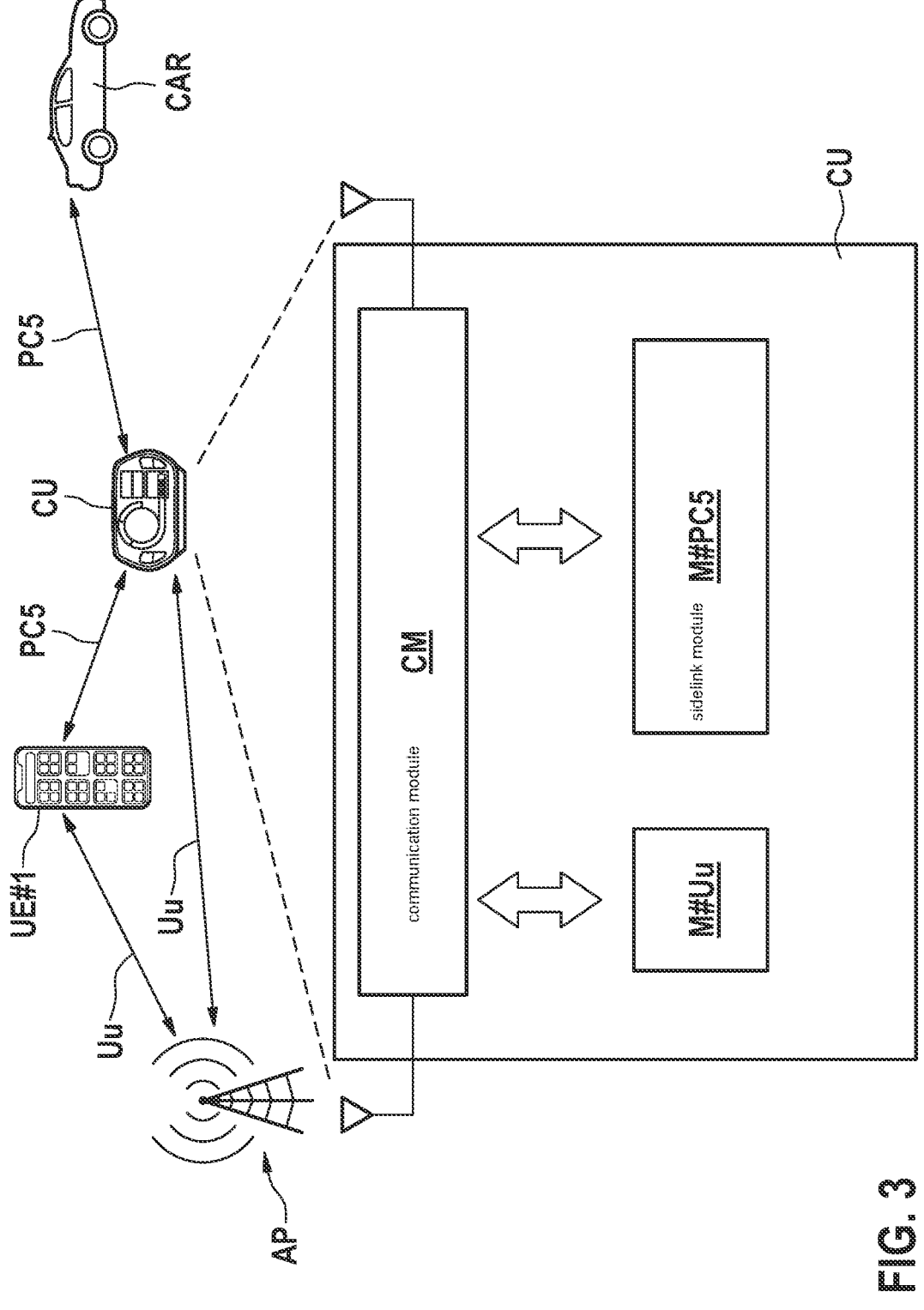
FIGS. 3 to 5 and 7 each depict examples of the control unit.

FIG. 3 depicts a schematic block diagram of the control unit or apparatus CU. A communication module CM comprises an RF part and is connected to at least one antenna. The communication CM is shared by a sidelink module M #PC5 and a Uu module M #Uu.

Both modules M #Uu and M #PC5 provide reduced capabilities in comparison with UE #1, for example. For example, RF interfaces and antennas are shared between the modules where the operation can be time multiplexed. A configuration path between the modules M #Uu and M #PC5 does not exist. In this case, the sidelink configuration for the module M #PC5 is enables via UE #1 that represents a relay-to-network device, which is connected on its own to the cellular radio network.

The module M #Uu has at least one of the following functions: configuring Uu interface for a reduced capability; configuring mobility and handover for the reduced capability Uu; and mandatory reduced capability in Uplink and Downlink, data and control.

The module M #PC5 hast at least one of the following functions: sidelink relaying for control, configuration and data; U2N relay configuration that includes resources pools, resource allocations, handover information, mode 1 configured resources, mode 2 configured resources, mode 1 dynamic resources, sidelink data communication, sidelink data assisting information provision.

Figure 4:
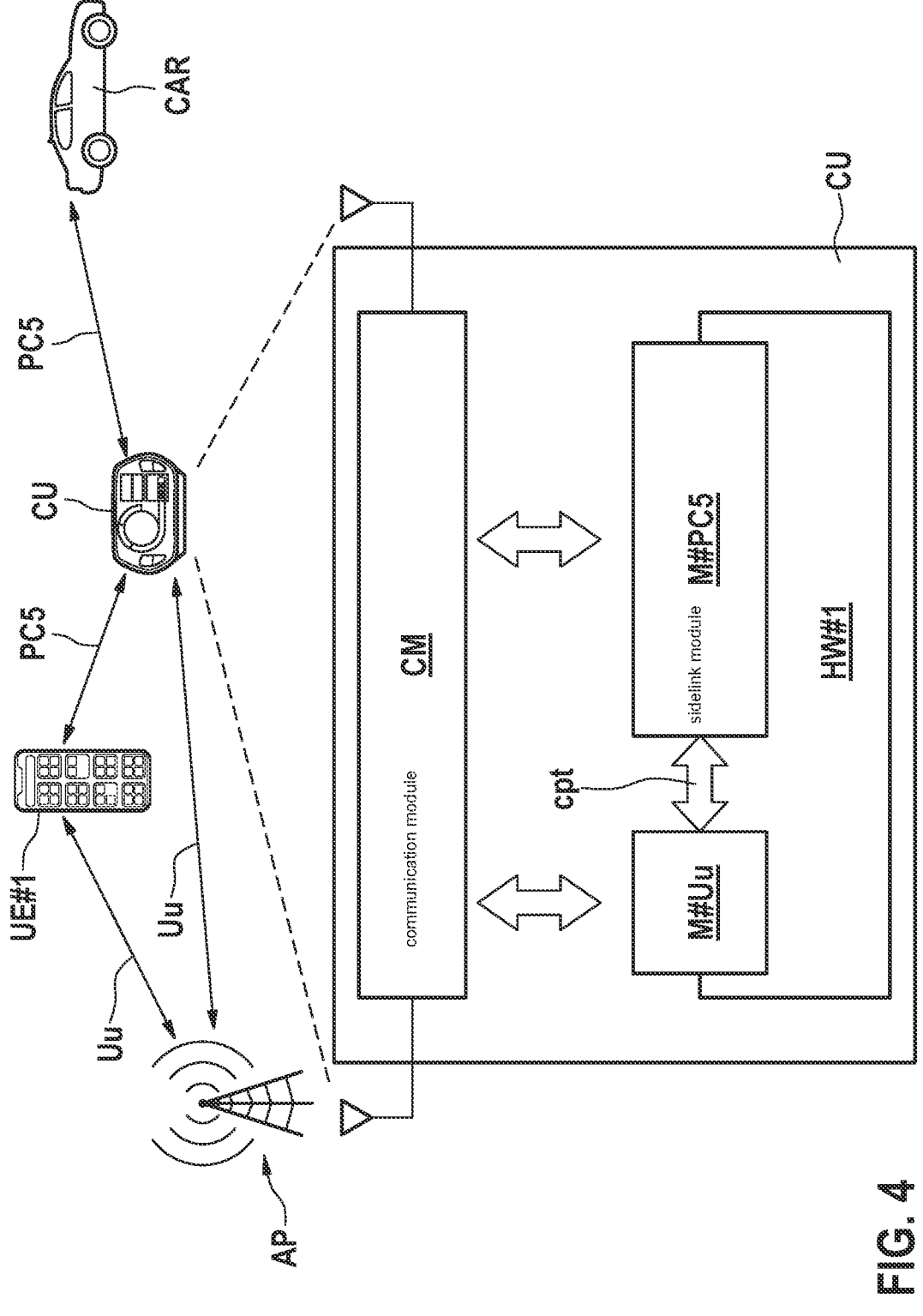

FIG. 4 depicts a schematic block diagram of the control unit or apparatus CU. Reference is made to FIG. 3 and its description. In contrast to the apparatus CU described in connection with FIG. 3, the sidelink module M #PC5 and the Uu module M #Uu have shared hardware HW #1. Both modules M #PC5 and M #Uu have a shared configuration path cpt. That is, received configuration parameters that are determined by one of the modules M #PC5, M #Uu are provided to the other module in order to configure the respective air interface.

As the modules M #PC5 and M #Uu share hardware, there is provided the configuration path cpt between them. The configuration path cpt carries configuration like synchronization and access option, subscription information, barring, supported Frequency list, etc., but not dynamic configuration. The dynamic configuration is provided via UE #1 as a relay station. This dynamic configuration may comprise dynamic resources, dynamic resource pool configuration, handover instruction for sidelink, and configured resources for mode 1 and mode 2 resource allocation options.

In addition to the functions outlined to FIG. 3, the module M #Uu comprises further at least one of the following functions: configuring basic sidelink features if connected via a configuration path including cell synchronization information, cell frequency list, supported sidelink/V2X capabilities.

Figure 5:
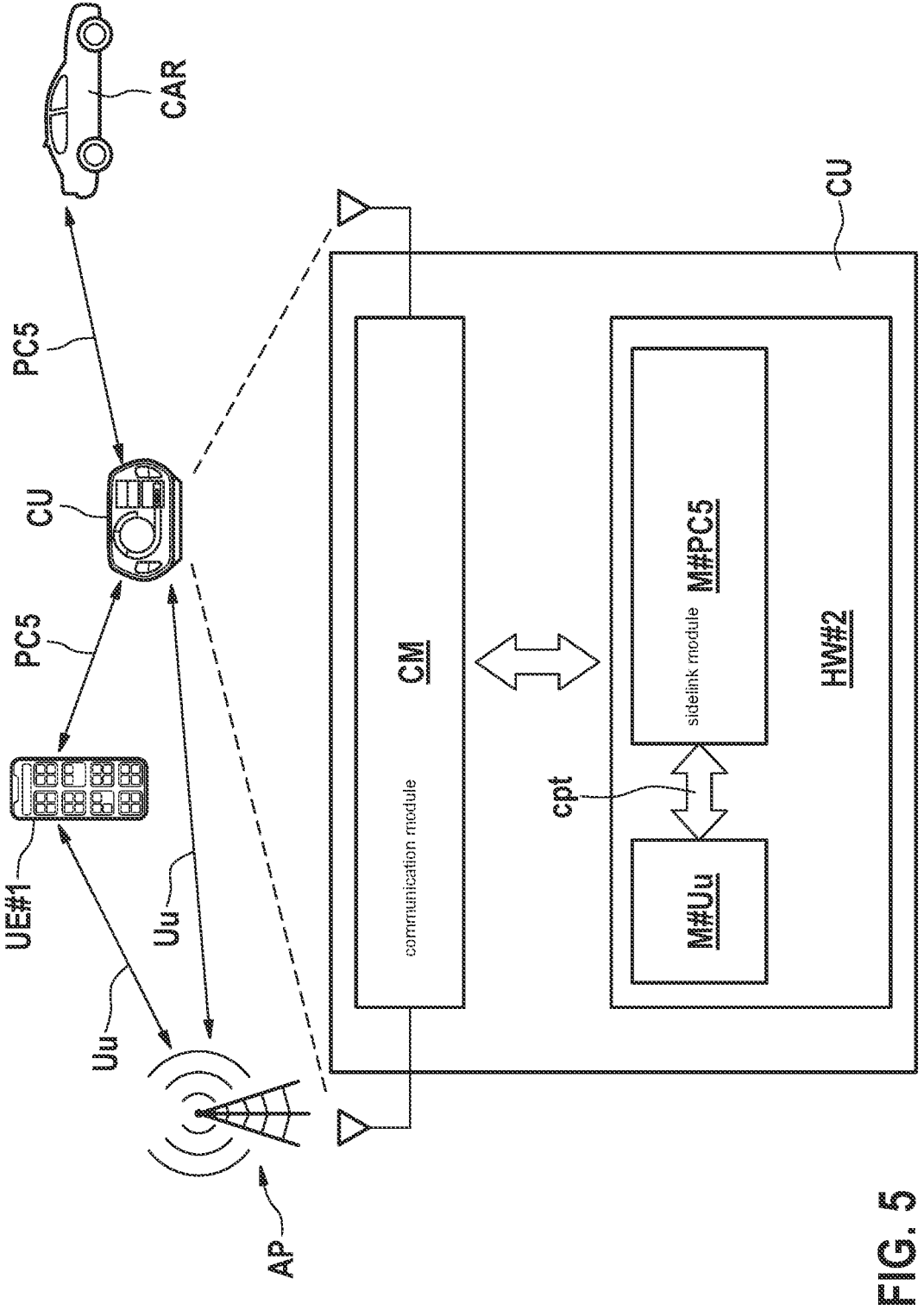

FIG. 5 depicts a schematic block diagram of the control unit or apparatus CU. Reference is made to FIG. 4 and its description. In contrast to the apparatus CU described in connection with FIG. 4, the sidelink module M #PC5 and the Uu module M #Uu are provided on the same piece of hardware HW #2, i.e. a system-on-a-chip or the like. Therefore, the interface to the communication module CM is simplified and a shared path is used for the communication between the different modules.

When the reduced-capability functionalities and the sidelink/PC5 functionalities are implemented on the same customized processors i.e., baseband and L2/L3 processor, the Uu reduced capability functionalities comprise mandatory Uu connectivity, e.g., cell access procedure, cell sync, mandatory UL/DL, paging, etc. The PC5 may conduct all sidelink functionalities. A limited mandatory Uu configuration link is available for PC5, e.g., synchronization information and further mandatory cell information. However, dynamic configuration and resource allocation are handled via UE to network relay station UE #1.

Figure 6:
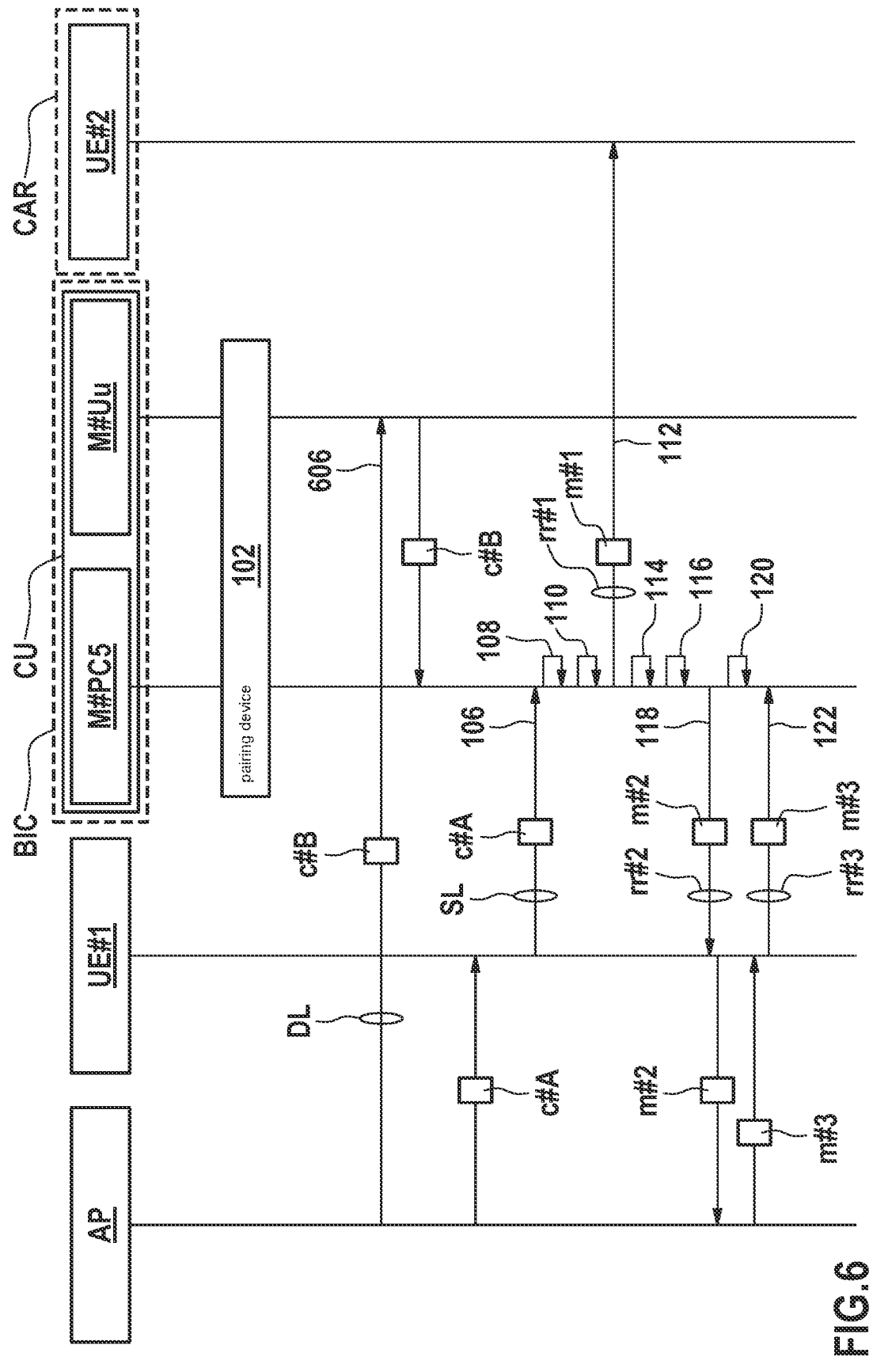

FIG. 6 depicts a schematic sequence diagram for operating the apparatus CU according to the examples of FIGS. 4 and 5.

Reference is made to the description of FIG. 2. Receiving means (i.e., receiver) 606 are provided to receive at least one further control information c #B, which originates from the radio access node AP and which characterizes at least one further configuration parameter of the sidelink channel. The module M #Uu provides the further control information c #B to the module M #PC5 via the configuration path. The at least one control information c #A is received 106 via the sidelink channel. The determining 110 of the at least one radio resource rr #1 of the sidelink channel is based on the at least one control information c #A and based on the at least one further control information c #B. The at least one further control information c #B characterizes at least one quasi-static configuration parameter of the sidelink channel like a cell synchronization parameter, a cell frequency list, at least one supported V2X capability or at least one supported sidelink capability. The at least one control information c #A characterizes at least one dynamic configuration parameter of the sidelink channel like at least one of the following: a resource pool configuration, at least one resource allocation, at least one handover information, radio resources configured for mode 1, radio resources configured for mode 2, dynamic radio resources configured for mode 1.

Figure 7:
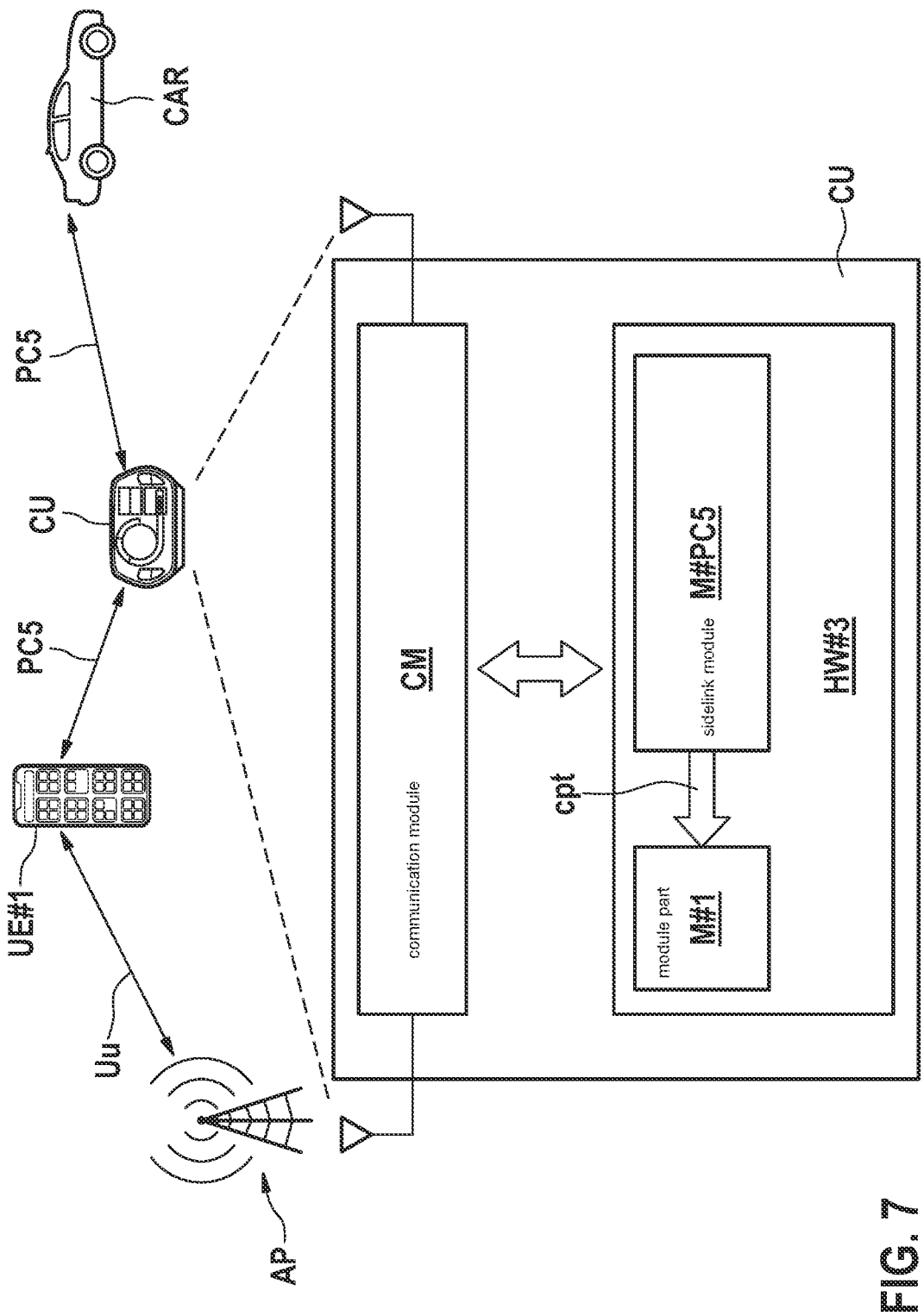

FIG. 7 depicts a schematic block diagram of the control unit or apparatus CU. In this example, the control unit CU comprises the sidelink module M #PC5 that receives the configuration for the sidelink channel via the relay station in form of UE #1 and stores this configuration via the configuration path cpt on a memory part M #1. The control unit CU does not comprise the Uu module M #Uu as mentioned before, therefore providing a simplified and cost-effective control unit CU.

As in this example, the CU comprises sidelink functionalities only, the baseband processing includes Uu configuration container that comprises configuration sent by the network via a U2N relay. Connectivity to the network is enables via the U2N relay UE #1 mobile handset attached/paired to the eBike/uMobility device.

Figure 8:
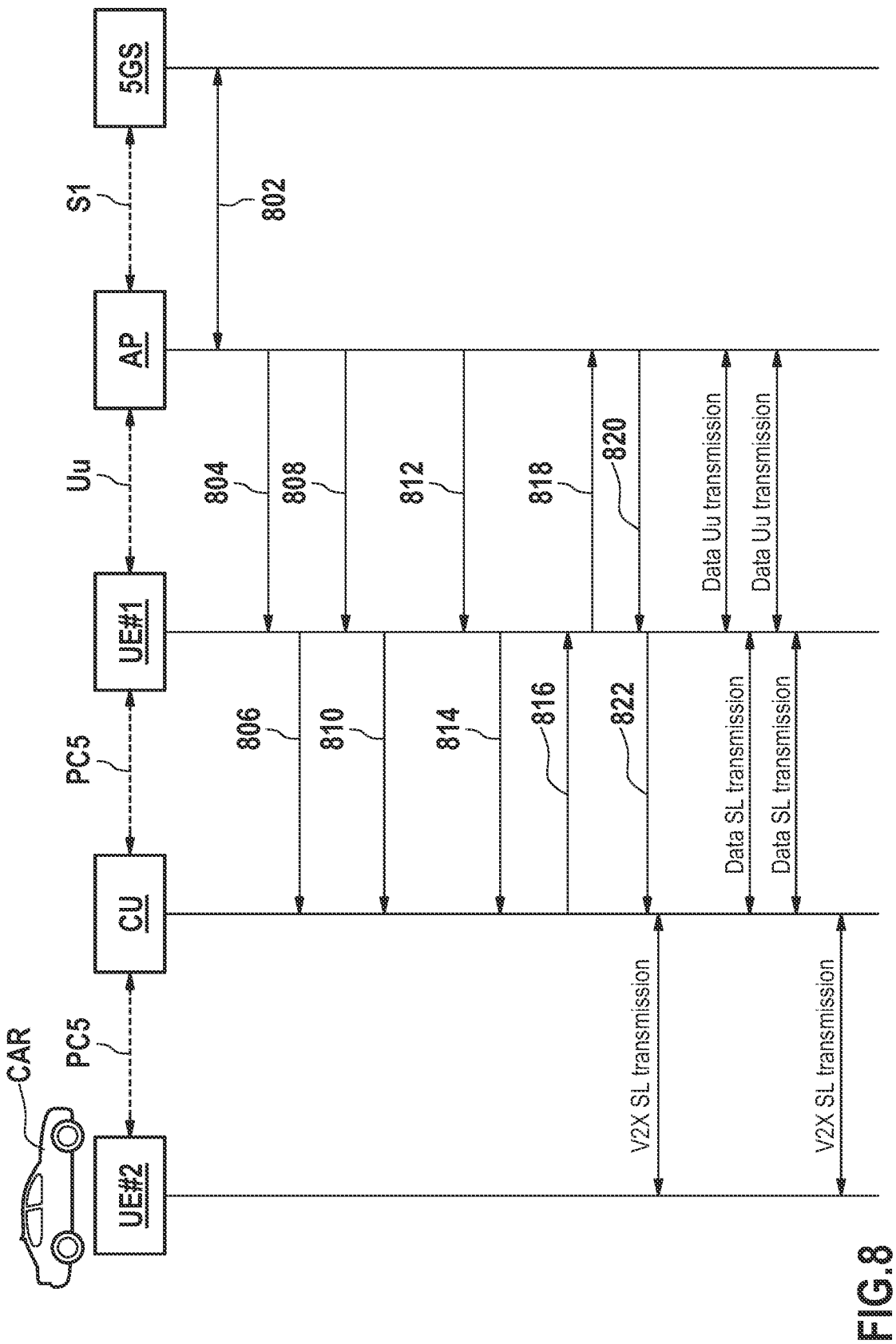

FIG. 8 depicts a schematic sequence diagram. According to a step 802 a connection between an entity 5GS and the access node AP is established. According to a step 804, the AP transmits SIB information with sidelink configuration and synchronization information to UE #1. According to a step 806, UE #1 transmits the received SIB information with sidelink configuration and synchronization information to the control unit CU. According to a step 808, a radio resource configuration, RRC, reconfiguration message is transmitted to UE #1, which in turn transmits this message as a relay station to the control unit CU according to step 810. Therefore, in steps 804 and 808, SIB broadcast acquisition information and RRC reconfiguration for sidelink is sent to the relay station in form of UE #1.

The network acquires the reduced capability of the control unit CU by transmitting a radio enquiry in step 812, which, in step 814 is transmitted by UE #1 to CU. CU transmits its radio information that comprises sidelink capabilities of CU and further radio parameters in step 816 to UE #1, which, in step 818 transmits the capability information to AP. A new sidelink configuration is determined based on the radio information indicated, for example by AP. The new sidelink configuration is transmitted in steps 820 and 822 from the AP to the CU via UE #1. The control unit CU transmits sidelink data to UE #2 and UE #1 based on the former received new sidelink configuration.

What is claimed is:

1. A method for operating an apparatus of a lightweight vehicle, comprising the following steps:
   pairing the apparatus with a personal mobile terminal to use the personal mobile terminal as a relay station;
   receiving, via the personal mobile terminal, at least one control information, which originates from a radio access node and which characterizes at least one configuration parameter of a sidelink channel;
   determining at least one V2X message;
   selecting for transmission at least one radio resource of the sidelink channel based on the at least one control information; and
   transmitting, towards a further vehicle, via the at least one radio resource of the sidelink channel, the at least one V2X message.

2. The method according to claim 1, wherein the lightweight vehicle is a pedal electric cycle or an electric kick scooter or a motor cycle or a 2/3-wheeler.

3. The method according to claim 1, further comprising the following steps:
   transmitting, via the personal mobile terminal towards the radio access node, an indicator that indicates at least one radio parameter of the apparatus, the indicator including a capability indicator that indicates at least one radio capability of the apparatus; and
   wherein the control information is received via the personal mobile terminal as a response to the capability indicator.

4. The method according to claim 1, further comprising:
   determining at least one further radio resource of the sidelink channel based on the at least one received control information;
   determining at least one V2N message; and
   transmitting, via the at least one further radio resource via the via the personal mobile terminal towards the radio access node, the at least one V2N message.

5. The method according to claim 1, further comprising:
   determining at least one other radio resource of the sidelink channel based on the at least one received control information;
   receiving, via the at least one other radio resource at least one further V2N message from the personal mobile terminal that originates from the radio access node.

6. The method according to claim 1, further comprising:
   receiving at least one further control information, which originates from the radio access node and which characterizes at least one further configuration parameter of the sidelink channel;
   wherein the at least one control information is received via the sidelink channel; and
   wherein the determining of the at least one radio resource of the sidelink channel is based on the at least one control information and based on the at least one further control information.

7. The method according to claim 6,
   wherein the at least one further control information characterizes at least one quasi-static configuration parameter of the sidelink channel; and
   wherein the at least one control information characterizes at least one dynamic configuration parameter of the sidelink channel.

8. The method according to claim 1, wherein the transmitting toward the further vehicle occurs over a direct communication channel to the further vehicle.

9. An apparatus of a vehicle, comprising:
a pairing device configured to pair the apparatus with a personal mobile terminal in order to use the personal mobile terminal as a relay station;
a receiver configured to receive, via the personal mobile terminal, at least one control information, which originates from a radio access node and which characterizes at least one configuration parameter of a sidelink channel;
a determination device configured to determine at least one V2X message;
a selection device configured to select for transmission at least one radio resource of the sidelink channel based on the at least one control information; and
a transmitter configured to transmit, towards a further vehicle, via the at least one radio resource of the sidelink channel, the at least one V2X message.

10. The apparatus according to claim 9, wherein the vehicle is a pedal electric cycle or an electric kick scooter or a motor cycle or a 2/3-wheeler.

11. The apparatus according to claim 9, further comprising:
a transmitter configured to transmit, via the personal mobile terminal towards the radio access node, an indicator, the indicator including a capability indicator that indicates at least one radio capability of the apparatus; and
wherein the control information is received via the personal mobile terminal as a response to the capability indicator.

12. The apparatus according to claim 9, further comprising:
a determination device configured to determine at least one further radio resource of the sidelink channel based on the at least one received control information;
a determination device configured to determine at least one V2N message; and
a transmitter configured to transmit, via the at least one further radio resource via the via the personal mobile terminal towards the radio access node, the at least one V2N message.

13. The apparatus according to claim 9, further comprising:
a determination device configured to determine at least one other radio resource of the sidelink channel based on the at least one received control information;
a receiver configured to receive, via the at least one other radio resource at least one further V2N message from the personal mobile terminal that originates from the radio access node.

14. The apparatus according to claim 9, further comprising:
a receiver configured to receive at least one further control information, which originates from the radio access node and which characterizes at least one further configuration parameter of the sidelink channel;
wherein the at least one control information is received via the sidelink channel;
wherein the determining of the at least one radio resource of the sidelink channel is based on the at least one control information and based on the at least one further control information.

15. The apparatus according to claim 14,
wherein the at least one further control information characterizes at least one quasi-static configuration parameter of the sidelink channel; and
wherein the at least one control information characterizes at least one dynamic configuration parameter of the sidelink channel.

16. The apparatus according to claim 9, further comprising:
a sidelink modem, wherein a V2X configuration is received via the personal mobile terminal; or
a sidelink modem and a reduced capability modem, wherein a V2X configuration and control is received via the personal mobile terminal; or
a sidelink modem and a reduced capability modem, wherein a V2X configuration and control is received via the personal mobile terminal and a further quasi-static V2X configuration and control is received via the reduced capability modem via a shared memory and path.

17. The apparatus according to claim 16, further comprising:
a shared RF hardware or antenna connection or shared frontend; and
(i) shared modem processing including reduced capability modules and sidelink V2X modules, or
(ii) shared hardware and processing modules for baseband and partially separated reduced capability modules and sidelink V2X modules connected via shared memory and path, or
(iii) a separated reduced capability modem and a sidelink V2X modem.

18. The apparatus according to claim 9, wherein the transmitter transmits toward the further vehicle over a direct communication channel to the further vehicle.

19. A lightweight vehicle, comprising:
an apparatus including:
a pairing device configured to pair the apparatus with a personal mobile terminal in order to use the personal mobile terminal as a relay station;
a receiver configured to receive, via the personal mobile terminal, at least one control information, which originates from a radio access node and which characterizes at least one configuration parameter of a sidelink channel;
a determination device configured to determine at least one V2X message;
a selection device configured to select for transmission at least one radio resource of the sidelink channel based on the at least one control information; and
a transmitter configured to transmit, towards a further vehicle, via the at least one radio resource of the sidelink channel, the at least one V2X message.

20. The lightweight vehicle according to claim 19, wherein the lightweight vehicle is a pedal electric cycle or an electric kick scooter or a motor cycle or a 2/3-wheeler.

21. The lightweight vehicle according to claim 19, wherein the transmitter transmits toward the further vehicle over a direct communication channel to the further vehicle.

* * * * *